United States Patent
Tang et al.

(10) Patent No.: US 10,786,733 B2
(45) Date of Patent: Sep. 29, 2020

(54) INFORMATION PROCESSING METHOD, TERMINAL, AND COMPUTER STORAGE MEDIUM FOR RELEASING VIRTUAL SKILL OBJECT BASED ON USER GESTURE

(71) Applicant: TENCENT TECHNOLOGY (SHENZHEN) COMPANY LIMITED, Shenzhen (CN)

(72) Inventors: Yong Tang, Shenzhen (CN); Yu Chen, Shenzhen (CN); Jianmiao Weng, Shenzhen (CN); Wei Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 141 days.

(21) Appl. No.: 15/835,102

(22) Filed: Dec. 7, 2017

(65) Prior Publication Data

US 2018/0147488 A1 May 31, 2018

Related U.S. Application Data

(63) Continuation of application No. PCT/CN2016/081052, filed on May 4, 2016.

(30) Foreign Application Priority Data

Sep. 29, 2015 (CN) .......................... 2015 1 0633983

(51) Int. Cl.
  *A63F 13/40* (2014.01)
  *A63F 13/426* (2014.01)
  (Continued)

(52) U.S. Cl.
  CPC .......... *A63F 13/40* (2014.09); *A63F 13/2145* (2014.09); *A63F 13/422* (2014.09);
  (Continued)

(58) Field of Classification Search
  CPC ...... A63F 13/40; A63F 13/422; A63F 13/426; A63F 13/2145
  See application file for complete search history.

(56) References Cited

U.S. PATENT DOCUMENTS

| 6,165,073 A * | 12/2000 | Miyamoto .............. A63F 13/10 463/32 |
| 2002/0103031 A1* | 8/2002 | Neveu ..................... A63F 13/06 463/49 |

(Continued)

FOREIGN PATENT DOCUMENTS

| CN | 102693074 A | 9/2012 |
| CN | 102886140 A | 1/2013 |

(Continued)

OTHER PUBLICATIONS

The Japan Patent Office (JPO) Office Action for Application No. 2017-564488 dated Oct. 30, 2018 4 Pages (including translation).

(Continued)

*Primary Examiner* — Chase E Leichliter (74) *Attorney, Agent, or Firm* — Anova Law Group, PLLC (57) ABSTRACT

A method for releasing virtual skill object based on user gesture is provided. A user character object is rendered in a GUI. The user character object can perform a virtual operation according to an input user command. A skill operation trigger gesture on at least one skill object available to be released by the user character object is detected in a skill operation area in the GUI. Movement of the skill object and a release location of the skill object is determined according to a skill release trigger gesture. A distance between the release location and the user character object is determined. When the distance is greater than a skill release distance, the user character object is adjusted to move towards the release location. A skill release operation on the skill object is (Continued)

performed based on the release location when detecting a skill operation release gesture on the skill object.

19 Claims, 8 Drawing Sheets

(51) Int. Cl.
  *A63F 13/422* (2014.01)
  *A63F 13/56* (2014.01)
  *A63F 13/822* (2014.01)
  *A63F 13/2145* (2014.01)
  *A63F 13/92* (2014.01)
  *A63F 13/71* (2014.01)
  *A63F 13/35* (2014.01)

(52) U.S. Cl.
  CPC ............ *A63F 13/426* (2014.09); *A63F 13/56* (2014.09); *A63F 13/822* (2014.09); *A63F 13/92* (2014.09); *A63F 13/35* (2014.09); *A63F 13/71* (2014.09); *A63F 2300/64* (2013.01)

(56) References Cited

U.S. PATENT DOCUMENTS

| | | | |
|---|---|---|---|
| 2006/0111182 A1* | 5/2006 | Nakanishi | A63F 13/426 463/36 |
| 2006/0252531 A1* | 11/2006 | Kando | A63F 13/10 463/30 |
| 2006/0258443 A1* | 11/2006 | Moro | A63F 13/426 463/30 |
| 2008/0026843 A1* | 1/2008 | Nakasaka | G06F 3/04883 463/37 |
| 2010/0004041 A1* | 1/2010 | Shindo | A63F 13/10 463/4 |
| 2010/0240429 A1* | 9/2010 | Chosogabe | A63F 13/812 463/3 |
| 2010/0267435 A1* | 10/2010 | Taya | A63F 13/10 463/2 |
| 2010/0267436 A1* | 10/2010 | Lee | A63F 13/833 463/8 |
| 2011/0039618 A1* | 2/2011 | Ichiyanagi | A63F 13/803 463/31 |
| 2012/0178531 A1* | 7/2012 | Yamada | A63F 13/50 463/33 |
| 2012/0327106 A1* | 12/2012 | Won | G06F 3/04883 345/619 |
| 2013/0143653 A1 | 6/2013 | Yamaoka | |
| 2013/0288790 A1 | 10/2013 | Wang | |
| 2013/0316813 A1 | 11/2013 | Derome et al. | |
| 2013/0316817 A1 | 11/2013 | Tanzawa et al. | |
| 2013/0342460 A1 | 12/2013 | Vincent et al. | |
| 2014/0121012 A1* | 5/2014 | Tagawa | A63F 13/2145 463/31 |
| 2015/0157932 A1* | 6/2015 | Kwon | G06Q 50/00 463/31 |
| 2015/0273343 A1* | 10/2015 | Watabe | A63F 13/2145 463/31 |
| 2016/0124518 A1* | 5/2016 | Takahashi | G06F 3/04842 463/31 |
| 2016/0129345 A1* | 5/2016 | Seok | A63F 13/426 463/31 |
| 2016/0199728 A1* | 7/2016 | Yoon | A63F 13/2145 463/37 |
| 2017/0072311 A1* | 3/2017 | Maejima | A63F 13/35 |
| 2018/0028914 A1* | 2/2018 | Yamaguchi | A63F 13/422 |
| 2018/0147488 A1 | 5/2018 | Tang et al. | |
| 2018/0185747 A1* | 7/2018 | Li | A63F 13/214 |
| 2018/0200616 A1* | 7/2018 | Li | A63F 13/428 |

FOREIGN PATENT DOCUMENTS

| | | |
|---|---|---|
| CN | 103475659 A | 12/2013 |
| CN | 103699379 A | 4/2014 |
| CN | 104076986 A | 10/2014 |
| CN | 105148517 A | 12/2015 |
| EP | 2184672 A1 | 5/2010 |
| EP | 3345664 A1 | 7/2018 |
| JP | H1195650 A | 4/1999 |
| JP | 2004073682 A | 3/2004 |
| JP | 2006122519 A | 5/2006 |
| JP | 2006181286 A | 7/2006 |
| WO | 2014132525 A1 | 9/2014 |
| WO | 2017054453 A1 | 4/2017 |

OTHER PUBLICATIONS

Tomoyuki Shimamura, "PC game review "Strong hold perfect Japanese version"", [online], Sep. 4, 2002, Impress, Inc., GAME Watch, [Oct. 11, 2018 search], Internet <URL: https://game.watch.impress.co.jp/docs/20020904/strong.htm> 17 Pages (including translation).
The World Intellectual Property Organization (WIPO) International Search Report for PCT/CN2016/081052 dated Aug. 11, 2016 6 Pages (including translation).
The State Intellectual Property Office of the People's Republic of China (SIPO) Office Action 1 for 201510633983.7 dated Dec. 29, 2016 6 Pages (including translation).
Korean Intellectual Property Office (KIPO) Office Action 1 for 10-2017-7033641 dated Nov. 26, 2018 11 Pages (including translation).
Canadian Intellectual Property Office Application No. 2985870 Sep. 19, 2018 4 Pages.
The European Patent Office (EPO) The Extended European Search Report for 16850078.3 dated Jun. 19, 2019 9 Pages.
Canadian Intellectual Property Office Application No. 2985870 Sep. 12, 2019 4 Pages.

* cited by examiner

INFORMATION PROCESSING METHOD, TERMINAL, AND COMPUTER STORAGE MEDIUM FOR RELEASING VIRTUAL SKILL OBJECT BASED ON USER GESTURE

CROSS-REFERENCES TO RELATED APPLICATIONS

This application is a continuation application of PCT Patent Application No. PCT/CN2016/081052, filed on May 4, 2016, which claims priority to Chinese Patent Application No. 201510633983.7, entitled "INFORMATION PROCESSING METHOD, TERMINAL, AND COMPUTER STORAGE MEDIUM" filed on Sep. 29, 2015, the entire contents of both of which are incorporated herein by reference.

FIELD OF THE TECHNOLOGY

The present disclosure relates to information processing technologies, and in particular, to an information processing method, a terminal, and a computer storage medium.

BACKGROUND OF THE DISCLOSURE

With rapid development of Internet technologies and gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface (GUI) obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

In the existing technology, a virtual object that is controlled by a user in a GUI generally has at least one skill, and can perform information exchange with a target object within a particular range by means of skill release. Different released skills lead to different interaction response result for the target object. However, skill release is always performed on a target object within a particular area range, and the range is large and it is not targeted. In a scenario in which there is only one target object within the particular area range or locations of target objects are relatively centralized, interaction results obtained in such an interaction manner usually cannot meet a requirement of the user. In related technologies, currently, there is still no effective solution to making skill release be directed to a particular location.

SUMMARY

Embodiments of the present disclosure provide an information processing method, a terminal, and a computer storage medium, so as to make skill release be directed to a particular location in an information exchange process, thereby improving user experience.

To achieve the foregoing objective, the technical solutions in the embodiments of the present disclosure are implemented as follows:

An embodiment of the present disclosure provides an information processing method, applied a terminal having a processor, a memory and a display. The method includes: rendering one or more virtual resource object in a GUI, at least one of the one or more virtual resource object being configured as a user character object that performs a virtual operation according to an input user command; detecting a skill operation trigger gesture on at least one skill object deployed in a skill operation area in the GUI; detecting, in response to the skill operation trigger gesture, movement of the skill object according to a skill release trigger gesture, to determine a release location of the skill object; detecting a distance between the release location and the user character object; adjusting, when the distance is greater than a skill release distance, the user character object to move towards the release location; and performing a skill release operation on the skill object based on the release location when detecting a skill operation release gesture on the skill object.

An embodiment of the present disclosure further provides a terminal, the terminal including: a memory; a processor coupled to the memory; and a display. The processor is configured to: render one or more virtual resource object in a graphical user interface (GUI), at least one of the one or more virtual resource object being configured as a user character object that performs a virtual operation according to an input user command; detect a skill operation trigger gesture on at least one skill object deployed in a skill operation area in the GUI; detect, in response to the skill operation trigger gesture, movement of the skill object according to a skill release trigger gesture, to determine a release location of the skill object; detect a distance between the release location and the user character object, and adjust, when the distance is greater than a skill release distance, the user character object to move towards the release location; and perform a skill release operation on the skill object based on the release location when detecting a skill operation release gesture on the skill object.

An embodiment of the present disclosure further provides a computer storage medium, a computer executable instruction being stored in the computer storage medium, and the computer executable instruction being configured to perform the information processing method. The method includes: rendering one or more virtual resource object in a GUI, at least one of the one or more virtual resource object being configured as a user character object that performs a virtual operation according to an input user command; detecting a skill operation trigger gesture on at least one skill object deployed in a skill operation area in the GUI; detecting, in response to the skill operation trigger gesture, movement of the skill object according to a skill release trigger gesture, to determine a release location of the skill object; detecting a distance between the release location and the user character object; adjusting, when the distance is greater than a skill release distance, the user character object to move towards the release location; and performing a skill release operation on the skill object based on the release location when detecting a skill operation release gesture on the skill object.

DESCRIPTION OF EMBODIMENTS

The present disclosure is further described in detail below with reference to the accompanying drawings and specific embodiments.

Figure 1:
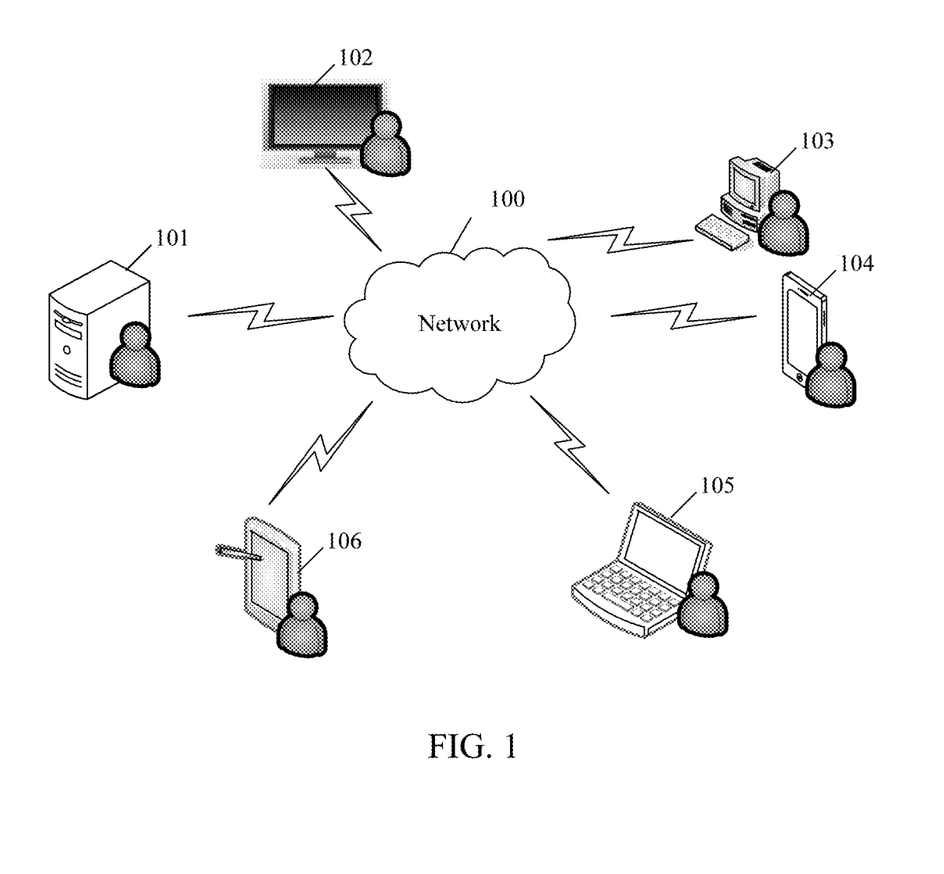
FIG. 1 is a schematic diagram of an application architecture of information exchange in an information processing method according to an embodiment of the present disclosure.

FIG. 1 is a schematic diagram of an application architecture of information exchange in an information processing method according to an embodiment of the present disclosure. As shown in FIG. 1, the application architecture includes: a server 101 and at least one terminal. As shown in the application architecture, the terminal includes: a terminal 102, a terminal 103, a terminal 104, a terminal 105, and a terminal 106. The at least one terminal may establish a connection to the server 101 by using a network 100 (such as a wired network or a wireless network). Specifically, the terminal includes a mobile phone, a desktop computer, a PC, an all-in-one PC, and other types.

In this embodiment, a processor of the terminal can execute a software application and perform rendering on a display of the terminal, to obtain a GUI. The processor, the GUI, and the software application are implemented on a game system. In this embodiment, in a process of implementing the processor, the GUI, and the software application in the game system, the at least one terminal may perform information exchange with the server 101 by using a wired network or a wireless network, to implement a one-to-one or many-to-many (such as three-to-three or five-to-five) application scenario in the game system. In the one-to-one application scenario, a virtual resource object in a GUI obtained through rendering by a terminal may perform information exchange with a virtual resource object preset in the game system (which may be understood as man vs machine), that is, the terminal performs information exchange with the server. Alternatively, in the one-to-one application scenario, a virtual resource object in a GUI obtained through rendering by a terminal may perform information exchange with a virtual resource object in a GUI obtained through rendering by another terminal, for example, a virtual resource object in a GUI obtained through rendering by the terminal 102 performs information exchange with a virtual resource object in a GUI obtained through rendering by the terminal 103. In the many-to-many application scenario, using the three-to-three application scenario as an example, virtual resource objects in GUIs that are obtained through rendering respectively performed by a terminal 1, a terminal 2, and a terminal 3 are grouped into a first group, virtual resource objects in GUIs that are obtained through rendering respectively performed by a terminal 4, a terminal 5, and a terminal 6 are grouped into a second group, and a group member in the first group performs information exchange with a group member in the second group.

The example in FIG. 1 is only an example of an application architecture for implementing the embodiments of the present disclosure, and the embodiments of the present disclosure are not limited to the application architecture in FIG. 1. Based on the application architecture, various embodiments of the present disclosure are provided.

Figure 2:
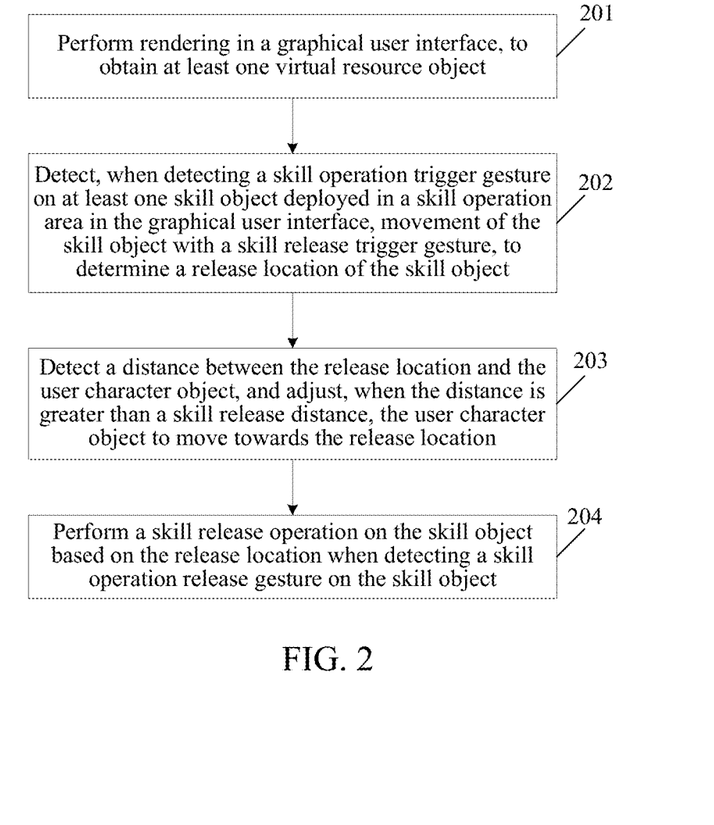
FIG. 2 is a schematic flowchart of an information processing method according to one embodiment of the present disclosure.

One embodiment of the present disclosure provides an information processing method. FIG. 2 is a schematic flowchart of the information processing method according to one embodiment of the present disclosure. The information processing method is applied to a terminal. A software application is executed on a processor of the terminal and rendering is performed on a display of the terminal, to obtain a GUI. The processor, the GUI, and the software application are implemented in a game system. As shown in FIG. 2, the method includes the following steps:

Step 201: Perform rendering in the GUI, to obtain at least one virtual resource object, at least one of the virtual resource object being configured as a user character object that performs a virtual operation according to an input user command. In other words, the method includes rendering one or more virtual resource object in a graphical user interface (GUI), at least one of the one or more virtual resource object being configured as a user character object that performs a virtual operation according to an input user command.

Step 202: Detect, when detecting a skill operation trigger gesture on at least one skill object deployed in a skill operation area in the GUI, movement of the skill object with a skill release trigger gesture, to determine a release location of the skill object. In other words, the method includes: detecting a skill operation trigger gesture on at least one skill object deployed in a skill operation area in the GUI; and detecting, in response to the skill operation trigger gesture, movement of the skill object according to a skill release trigger gesture, to determine a release location of the skill object.

Step 203: Detect a distance between the release location and the user character object, and adjust, when the distance is greater than a skill release distance, the user character object to move towards the release location.

Step 204: Perform a skill release operation on the skill object based on the release location when detecting a skill operation release gesture on the skill object.

Figure 3:
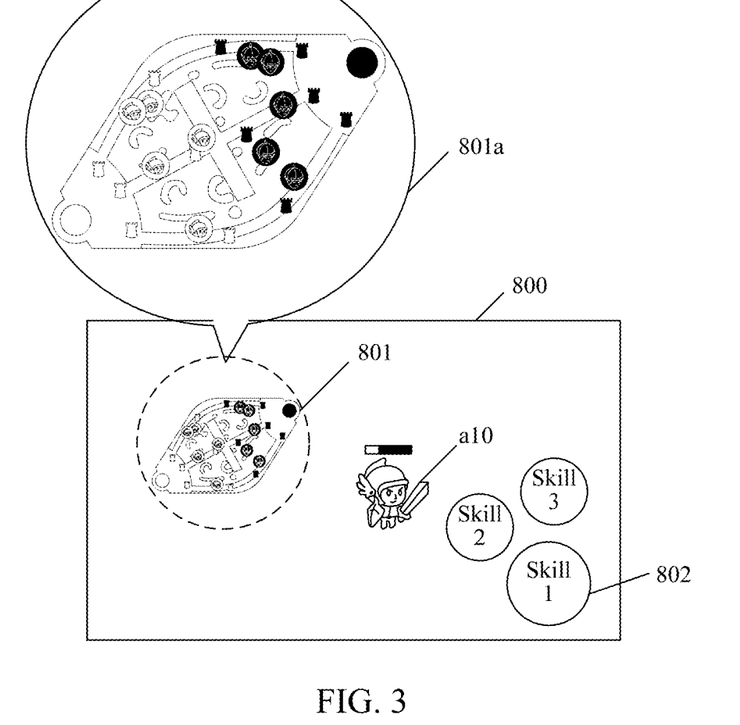
FIG. 3 is a first schematic diagram of a GUI in an information processing method according to an embodiment of the present disclosure.

FIG. 3 is a first schematic diagram of the GUI in the information processing method according to this embodiment of the present disclosure. As shown in FIG. 3, a GUI 800 obtained through rendering on the display of the terminal includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI further includes a mini map 801 of a virtual area in which the user character object is located. A schematic detailed drawing of the mini map 801 is shown by 801a. As can be learned, a location of each character object (including a friend and enemy) in the virtual area is identified in the mini map 801 (or the detailed drawing 801a of the mini map). The GUI further includes at least one skill object 802, and the user may control, by means of a skill release operation, the user character object to perform a corresponding skill release operation.

In this embodiment, the at least one skill object is deployed in the skill operation area in the GUI. As shown in FIG. 3, in an area at the lower right corner of the GUI is the skill operation area, the skill operation area includes the at least one skill object 802, and each skill object can be released. In an implementation, it should be noted that, after one skill object is released, the skill object can be released again after a period of time.

Figure 4A:
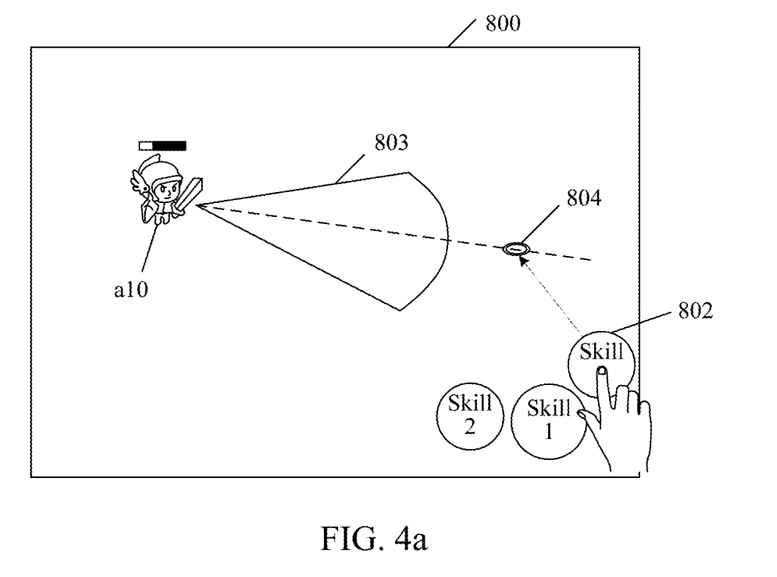
FIG. 4a to FIG. 4c are schematic diagrams of a first release scenario of a skill object in an information processing method according to an embodiment of the present disclosure.
Figure 4B:
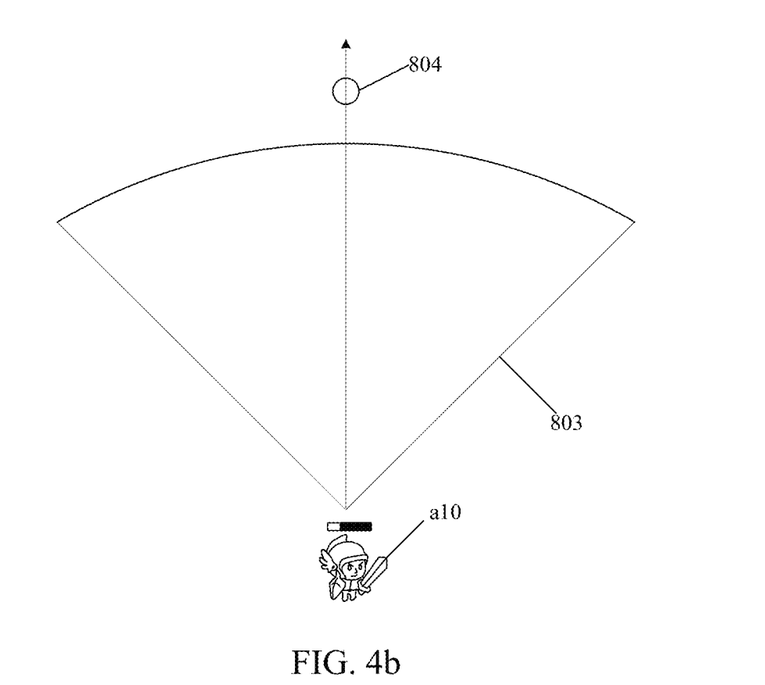
Figure 4C:
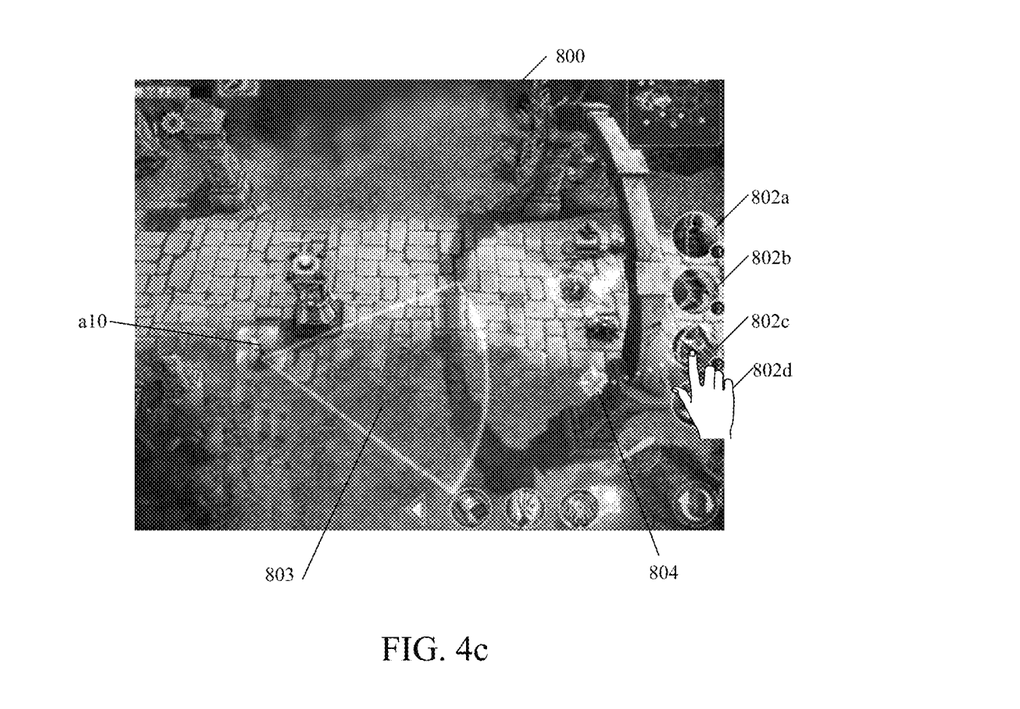
Figure 5A:
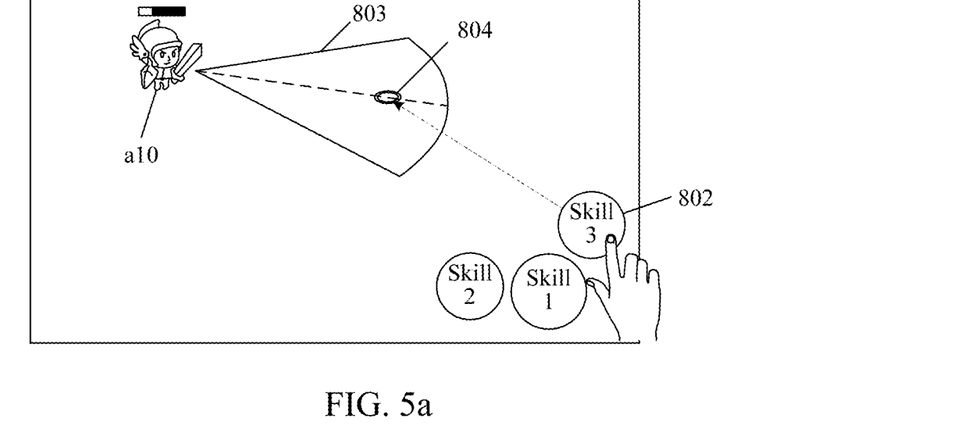
FIG. 5a to FIG. 5c are schematic diagrams of a second release scenario of a skill object in an information processing method according to an embodiment of the present disclosure.
Figure 5B:
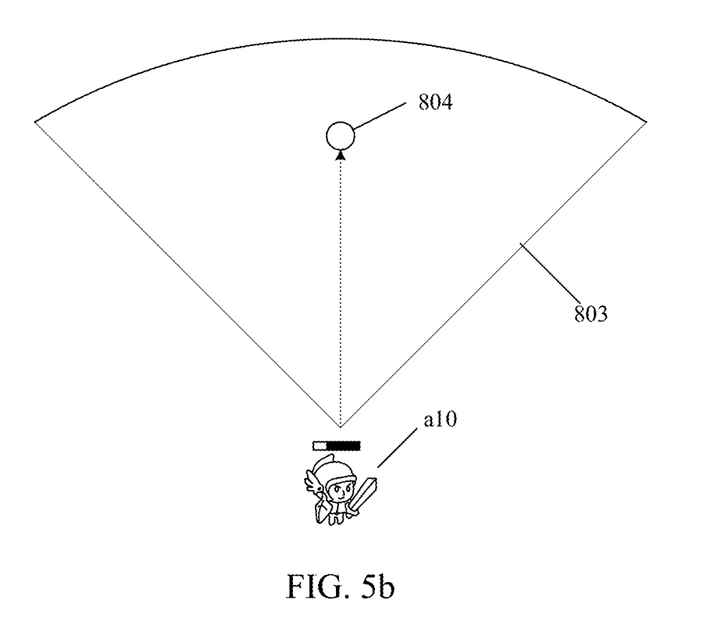
Figure 5C:
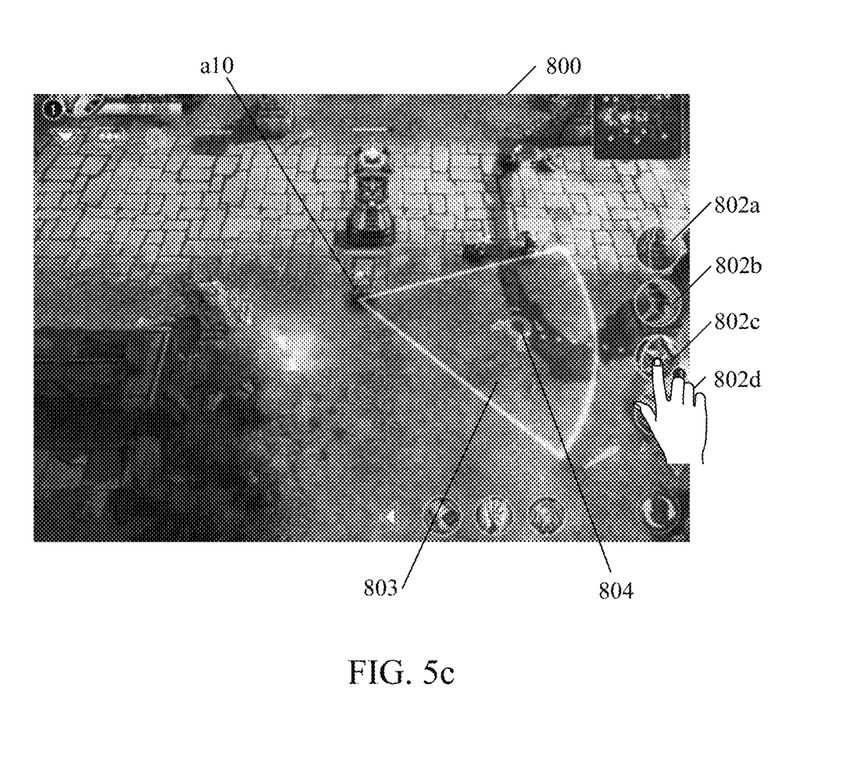

In this embodiment, when the terminal detects the skill operation trigger gesture on the at least one skill object, the skill operation trigger gesture is specifically a long press and drag gesture on the skill object. FIG. 4a to FIG. 4c are schematic diagrams of a first release scenario of a skill object in the information processing method according to this embodiment of the present disclosure; and FIG. 5a to FIG. 5c are schematic diagrams of a second release scenario of a skill object in the information processing method according to this embodiment of the present disclosure. As shown in FIG. 4a or FIG. 5a, when a skill object (such as a skill 3) is long pressed and dragged to move in the GUI, a stop location of the drag is a release location 804 of the skill object. The skill object may move to any location with movement of the skill release trigger gesture. Therefore, the user may rapidly determine the release location 804 of the skill object by means of the skill release trigger gesture according to a requirement of interaction, so as to perform the skill release operation based on the release location. On this basis, movement of the skill object with the skill release trigger gesture is detected, to determine the release location of the skill object.

In an implementation, the detecting movement of the skill object with a skill release trigger gesture, to determine a release location of the skill object includes:

continuously detecting location information of the skill release trigger gesture, controlling movement of the skill object based on the location information, detecting a stop location of the skill release trigger gesture when the skill release trigger gesture stops, and determining the stop location as the release location of the skill object.

Specifically, an XY coordinate system is established in virtual space in which the user character object is located; in a process in which the skill release trigger gesture moves, location information (the location information may be represented by using coordinate information) of an operation point of the skill release trigger gesture is detected in real time, and the skill object is controlled to move according to the location information (that is, the coordinate information); and when the skill release trigger gesture stops moving, detected location information is used as the release location of the skill object.

In this embodiment, a skill release attribute for the user character object includes a skill release range (for details, refer to a skill release range 803 in FIG. 4a, FIG. 4b, FIG. 5a, or FIG. 5b). For example, in this embodiment, the release location may be outside the skill release range, as shown in FIG. 4a or FIG. 4b. When the release location 804 is not within the skill release range 803, because a distance between the release location 804 and the user character object a10 is out of the skill release range 803 of the user character object a10, in the current scenario, for the user character object a10, a corresponding skill object cannot be released, and step 203 is further performed. Alternatively, in this embodiment, the release location may be within the skill release range, as shown in FIG. 5a or FIG. 5b. Because the release location 804 is within the skill release range 803, in the current scenario, for the user character object a10, the skill release operation on the skill object can be performed based on the release location 804, and step 204 is directly performed.

In an implementation, the adjusting the user character object to move towards the release location includes: detecting a first location of the user character object in the GUI; determining, based on the release location and the first location, directional information about a direction of the release location relative to the user character object; and determining a first movement route based on the direction information, and adjusting the user character object to move towards the release location according to the first movement route.

Specifically, the terminal detects the first location of the user character object in the GUI (that is, first coordinate information); determines, by using obtained location information (denoted as second coordinate information) of the release location, the directional information about the direction of the release location relative to the user character object, that is, determines that the release location is in an XX direction of the user character object (such as the southeast or the direction of 9 o'clock). Because a map including path information is preset in the virtual space in which the user character object is located, the user character object needs to move according to the path information. On this basis, the terminal determines the first movement route based on the determined direction information and the path information, to control the user character object to be adjusted to move towards the release location according to the first movement route.

Further, the performing a skill release operation on the skill object based on the release location includes: performing the skill release operation on the skill object within a preset skill release range according to the direction information, where the preset skill release range is an axisymmetric area using the user character object as an endpoint, and the direction information is on an axis of symmetry of the axisymmetric area (i.e., the direction indicated by the directional information matches an axis of symmetry of the axisymmetric area).

In this embodiment, the user character object has a preset skill release range. For the preset skill release range, refer to what is shown in FIG. 4b or FIG. 5b. In this example, the preset skill release range is a fan-shaped area 803 using the user character object a10 as an endpoint. A connection line from the user character object to the release location is the axis of symmetry of the preset skill release range. Certainly, in another implementation, the preset skill release range is not limited to the fan-shaped area, and may be another area range having an axisymmetric attribute.

In an implementation, the method further includes: detecting a movement trigger gesture on the user character object in a process of adjusting the user character object to move towards the release location, and in response to the movement trigger gesture, stopping adjusting the user character object to move towards the release location, and stopping performing the skill release operation on the skill object based on the skill operation trigger gesture.

Specifically, in the process of adjusting the user character object to move towards the release location, when the terminal detects the movement trigger gesture on the user character object, that is, detects a manual moving operation performed by a user on the user character object, it may be understood that, when the user manually stops, by means of a movement trigger operation, the process of adjusting the user character object to move towards the release location, the terminal stops adjusting the user character object to move towards the release location, that is, stops performing the skill release operation on the skill object based on the skill operation trigger gesture.

In an implementation, the method further includes: detecting that the release location of the skill object is consistent with a start location of the skill operation trigger gesture, and in response to the release location being consistent with the start location, stopping performing the skill release operation on the skill object based on the skill operation trigger gesture.

In this embodiment, when it is detected that the start location of the skill operation trigger gesture is consistent with the stop location (that is, the release location), regardless of a path of the skill operation trigger gesture in a moving process, performing the skill release operation on the skill object based on the skill operation trigger gesture is stopped.

By means of the technical solution in this embodiment of the present disclosure, a release location of a skill object is changed randomly by means of a skill operation trigger gesture, and further, skill release is made to be directed to a particular location by means of the skill operation release gesture, so that in an interaction process, a user character object can be controlled to perform skill release towards a particular location (such as a location at which target objects for interaction are centralized) according to an actual requirement, thereby greatly improving operation experience of a user.

Referring to the descriptions of the foregoing method embodiment, an actual application scenario is used as an example to describe this embodiment of the present disclosure as follows: This application scenario is related to Multiplayer Online Battle Arena Games (MOBA). In MOBA, related terms are as follows: 1) UI layer, that is, an icon in a GUI; 2) skill indicator: a special effect, a halo, or an operation used to supplement skill release; 3) virtual lens, which may be understood as a camera in the game; and 4) mini map: a scaled-down version of a large map, which may be understood as a radar map, where information and locations of two parties are displayed in the map.

In this application scenario, referring to FIG. 4c or FIG. 5c, in this embodiment, the GUI 800 obtained through rendering includes the at least one user character object a10 and at least one skill object, and in this example, includes a skill object 802a, a skill object 802b, a skill object 802c, and a skill object 802d. When the terminal detects a skill operation trigger gesture (such as a hold and drag gesture) on a skill object, in this example, that is, when the terminal detects the skill operation trigger gesture on the skill object 802c, rendering is performed in the GUI 800, to obtain a skill release range 803 of the skill object 802c for the user character object a10, and movement of the skill object 802c with a UI icon is represented based on movement of the skill operation trigger gesture. When the skill operation trigger gesture stops moving, a stop location is determined as a release location 804 of the skill object 802c.

In this application scenario, two implementations are included. In a first implementation, referring to FIG. 4c, the release location 804 is out of the skill release range 803, and the terminal controls the user character object a10 to move towards the release location 804 until the release location 804 is within the skill release range 803. Further, when the skill operation trigger gesture stops (that is, the hold and drag gesture is released), the user character object a10 performs a release operation on the skill object 802c towards the release location 804. In a second implementation, referring to FIG. 5c, the release location 804 is within the skill release range 803, and when the skill operation trigger gesture stops (that is, the hold and drag gesture is released), the user character object a10 performs a release operation on the skill object 802c directly towards the release location 804.

Figure 6:
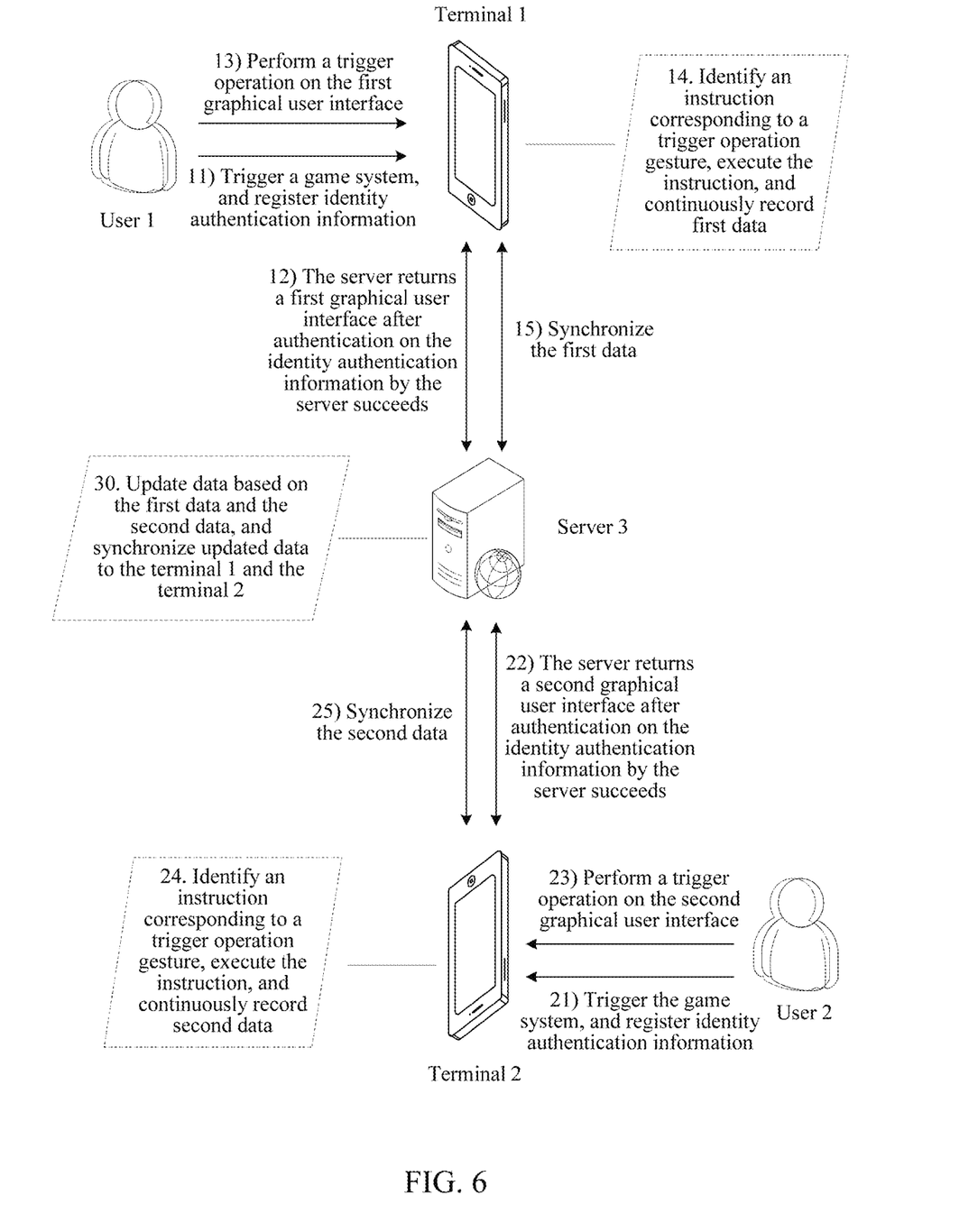
FIG. 6 is a schematic application diagram of interaction in an information processing method according to an embodiment of the present disclosure.

Based on the method embodiment, a one-to-one application scenario is used as an example for detailed description below. The one-to-one application scenario is an application scenario in which a first character object controlled by a terminal 1 performs information exchange with a second character object controlled by a terminal 2. For other application scenarios, refer to descriptions in this application scenario, and details are not described in this embodiment again. FIG. 6 is a schematic application diagram of interaction in the information processing method according to this embodiment of the present disclosure. As shown in FIG. 6, in this application scenario, the terminal 1, the terminal 2, and a server are included. A user 1 performs triggering and control by using the terminal 1, and a user 2 performs triggering and control by using the terminal 2; and the method includes the following steps:

For the user 1, Step 11: The user 1 triggers a game system and registers identity authentication information, where the identity authentication information may be a user name and a password.

Step 12: The terminal 1 transmits the obtained identity authentication information to the server 3, and the server 3 performs identity authentication, and returns a first GUI to the terminal 1 after the identity authentication succeeds, where the first GUI includes a first character object, the first character object can perform a virtual operation based on a trigger operation of the user 1, and the virtual operation includes a moving operation of the first character object, an attack operation or a skill release operation of the first character object for another character object, and the like; and the first GUI further includes a skill operation area, and the skill operation area includes at least one skill object.

For the user 2, Step 21: The user 2 triggers the game system and registers identity authentication information, where the identity authentication information may be a user name and a password.

Step 22: The terminal 2 transmits the obtained identity authentication information to the server 3, and the server 3 performs identity authentication, and returns a second GUI to the terminal 2 after the identity authentication succeeds, where the second GUI includes a second character object, the second character object can perform a virtual operation based on a trigger operation of the user 2, and the virtual operation includes a moving operation of the second character object, an attack operation or a skill release operation of the second character object for another character object, and the like; and the second GUI further includes a skill operation area, and the skill operation area includes at least one skill object.

In this embodiment, the user 1 and the user 2 make, based on the trigger operation, the first character object and the second character object be information exchange objects, that is, the first character object uses the second character object as a target interaction object, and correspondingly, the second character object uses the first character object as a target interaction object.

Till now, login operations and initialization operations of the user 1 and the user 2 in the game system are completed.

For the user 1, Step 13: The user 1 performs a trigger operation on the first GUI presented by the terminal 1, where the trigger operation may be performed on any virtual resource object in the first GUI, including a skill release operation on any skill object, an information exchange operation (which may be understood as a physical attack operation) on any character object, a moving operation of the first character object, and the like. In this embodiment, the trigger operation is a skill operation trigger gesture on the at least one skill object in the skill operation area.

Step 14: The terminal 1 identifies an operation location of the skill operation trigger gesture when obtaining the skill operation trigger gesture; uses a stop location of the skill operation trigger gesture as a release location of the skill object; further detects a distance between the release location and the first character object, adjusts, when the distance is greater than a skill release distance, the first character object to move towards the release location, until it is determined that the distance between the release location and the first character object meets the skill release distance; further generates a first instruction, and performs a skill release operation on the skill object based on the release location; and records a change of corresponding data in a process of executing the instruction.

Step 15: Use changed data as first data corresponding to the terminal 1 and synchronize the first data to the server 3.

For the user 2, Step 23: The user 2 performs a trigger operation on the second GUI presented by the terminal 2, where the trigger operation may be performed on any virtual resource object in the second GUI, including a skill release operation on any skill object, an information exchange operation (which may be understood as a physical attack operation) on any character object, a moving operation of the second character object, and the like. In this embodiment, the trigger operation is a skill operation trigger gesture on the at least one skill object in the skill operation area.

Step 24: The terminal 2 identifies an operation location of the skill operation trigger gesture when obtaining the skill operation trigger gesture; uses a stop location of the skill operation trigger gesture as a release location of the skill object; further detects a distance between the release location and the second character object, adjusts, when the distance is greater than a skill release distance, the second character object to move towards the release location, until it is determined that the distance between the release location and the second character object meets the skill release distance; further generates a second instruction, and performs a skill release operation on the skill object based on the release location; and records a change of corresponding data in a process of executing the instruction.

Step 25: Use changed data as second data corresponding to the terminal 2 and synchronize the second data to the server 3.

For the server 3, Step 30: Update data based on the first data synchronized by the terminal 1 and the second data synchronized by the terminal 2, and synchronize updated data respectively to the terminal 1 and the terminal 2.

Figure 7:
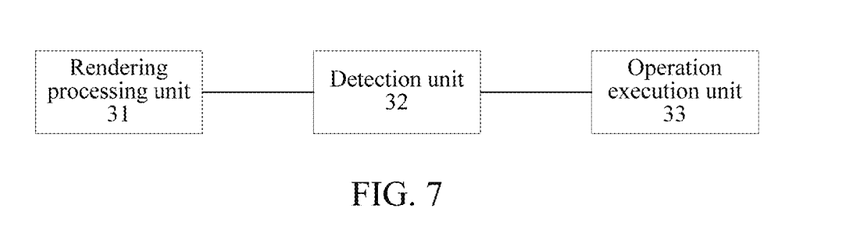
FIG. 7 is a schematic structural diagram of a terminal according to one embodiment of the present disclosure.

This embodiment of the present disclosure further provides a terminal. FIG. 7 is a schematic structural diagram of the terminal according to one embodiment of the present disclosure. As shown in FIG. 7, the terminal includes: a rendering processing unit 31, a detection unit 32, and an operation execution unit 33.

The rendering processing unit 31 is configured to: execute a software application and perform rendering, to obtain a GUI; and perform rendering in the GUI, to obtain at least one virtual resource object, at least one of the virtual resource object being configured as a user character object that performs a virtual operation according to an input user command.

The detection unit 32 is configured to: detect, when detecting a skill operation trigger gesture on at least one skill object deployed in a skill operation area in the GUI, movement of the skill object with a skill release trigger gesture, to determine a release location of the skill object; being further configured to detect a distance between the release location and the user character object; and being further configured to detect a skill operation release gesture on the skill object.

The operation execution unit 33 is configured to: adjust, when the detection unit 32 detects that the distance between the release location and the user character object is greater than a skill release distance, the user character object to move towards the release location; and is further configured to: perform, when the detection unit 32 detects the skill operation release gesture on the skill object, a skill release operation on the skill object based on the release location.

In this embodiment, referring to FIG. 3, the GUI obtained by performing rendering by the rendering processing unit 31 on the display of the terminal includes the at least one virtual resource object. The virtual resource object includes at least one user character object a10). A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI further includes a mini map 801 of a virtual area in which the user character object is located. A schematic detailed method drawing of the mini map 801 is shown by 801*a*. As can be learned, a location of each character object (including a friend and enemy) in the virtual area is identified in the mini map 801. The GUI further includes at least one skill object 803, and the user may control, by means of a skill release operation, the user character object to perform a corresponding skill release operation.

In this embodiment, the at least one skill object is deployed by the rendering processing unit 31 in the skill operation area in the GUI. As shown in FIG. 3, in an area at the lower right corner of the GUI is the skill operation area, the skill operation area includes the at least one skill object 802, and each skill object can be released. In an implementation, it should be noted that, after one skill object is released, the skill object can be released again after a period of time.

In this embodiment, when the detection unit 32 detects the skill operation trigger gesture on the at least one skill object, the skill operation trigger gesture is specifically a long press and drag gesture on the skill object. Referring to FIG. 4*a* or FIG. 5*a*, when a skill object (such as a skill 3) is long pressed and dragged to move in the GUI, a stop location of the drag is a release location 804 of the skill object. The skill object may move to any location with movement of the skill release trigger gesture. Therefore, the user may rapidly determine the release location 804 of the skill object by means of the skill release trigger gesture according to a requirement of interaction, so as to perform the skill release operation based on the release location. On this basis, movement of the skill object with the skill release trigger gesture is detected, to determine the release location of the skill object.

In an implementation, the detection unit 32 is configured to: continuously detect location information of the skill release trigger gesture, control movement of the skill object based on the location information, detect a stop location of the skill release trigger gesture when the skill release trigger gesture stops, and determine the stop location as the release location of the skill object.

Specifically, the detection unit 32 establishes an XY coordinate system in virtual space in which the user character object is located; in a process in which the skill release trigger gesture moves, detects location information (the location information may be represented by using coordinate information) of an operation point of the skill release trigger gesture in real time, and controls the skill object to move according to the location information (that is, the coordinate information); and when the skill release trigger gesture stops moving, uses detected location information as the release location of the skill object.

In this embodiment, a skill release attribute for the user character object includes a skill release range (for details, refer to a skill release range 803 in FIG. 4a, FIG. 4b, FIG. 5a, or FIG. 5b). Therefore, in this embodiment, the release location may be not within the skill release range, as shown in FIG. 4a or FIG. 4b. When the release location 804 is not within the skill release range 803, because a distance between the release location 804 and the user character object a10 is out of the skill release range 803 of the user character object a10, in the current scenario, for the user character object a10, a corresponding skill object cannot be released, and the user character object is further adjusted to move towards the release location. Alternatively, in this embodiment, the release location may be within the skill release range, as shown in FIG. 5a or FIG. 5b. Because the release location 804 is within the skill release range 803, in the current scenario, for the user character object a10, the skill release operation on the skill object can be performed based on the release location 804, and the operation execution unit 33 can perform the skill release operation on the user character object based on the release location.

In an implementation, the detection unit 32 is further configured to: detect a first location of the user character object in the GUI; determine, based on the release location and the first location, information about a direction of the release location relative to the user character object; and determine a first movement route based on the direction information; and the operation execution unit 33 is configured to adjust the user character object to move towards the release location according to the first movement route determined by the detection unit 32.

Specifically, the detection unit 32 detects the first location of the user character object in the GUI (that is, first coordinate information); determines, by using obtained location information (denoted as second coordinate information) of the release location, the information about the direction of the release location relative to the user character object, that is, determines that the release location is in an XX direction of the user character object (such as the southeast or the direction of 9 o'clock). Because a map including path information is preset in the virtual space in which the user character object is located, the user character object needs to move according to the path information. On this basis, the terminal determines the first movement route based on the determined direction information and the path information, to control the user character object to be adjusted to move towards the release location according to the first movement route.

In an implementation, the operation execution unit 33 is configured to: perform the skill release operation on the skill object within a preset skill release range according to the direction information, where the preset skill release range is an axisymmetric area using the user character object as an endpoint, and the direction information is on an axis of symmetry of the axisymmetric area.

In this embodiment, the user character object has a preset skill release range. Refer to what is shown in FIG. 4b or FIG. 5b. In this example, the preset skill release range is a fan-shaped area 803 using the user character object a10 as an endpoint. A connection line from the user character object to the release location is the axis of symmetry of the preset skill release range. Certainly, in another implementation, the preset skill release range is not limited to the fan-shaped area, and may be another area range having an axisymmetric attribute.

In an implementation, the detection unit 32 is further configured to: trigger the operation execution unit 33 when detecting a movement trigger gesture on the user character object in a process of adjusting, by the operation execution unit 33, the user character object to move towards the release location; and correspondingly, the operation execution unit 33 is configured to: stop adjusting the user character object to move towards the release location, and stop performing the skill release operation on the skill object based on the skill operation trigger gesture.

Specifically, in the process of adjusting the user character object to move towards the release location, when the detection unit 32 detects the movement trigger gesture on the user character object, that is, detects a manual moving operation performed by a user on the user character object, it may be understood that, when the user manually stops, by means of a movement trigger operation, the process of adjusting the user character object to move towards the release location, the terminal stops adjusting the user character object to move towards the release location, that is, stops performing the skill release operation on the skill object based on the skill operation trigger gesture.

In an implementation, the operation execution unit 33 is further configured to stop, when the detection unit 32 detects that the release location of the skill object is consistent with a start location of the skill operation trigger gesture, performing the skill release operation on the skill object based on the skill operation trigger gesture.

In this embodiment, when the detection unit 32 detects that the start location of the skill operation trigger gesture is consistent with the stop location (that is, the release location), regardless of a path of the skill operation trigger gesture in a moving process, the operation execution unit 33 stops performing the skill release operation on the skill object based on the skill operation trigger gesture.

A person skilled in the art should understand that functions of processing units in the terminal in this embodiment of the present disclosure may be understood by referring to related descriptions of the information processing method. The processing units in the information processing terminal in this embodiment of the present disclosure may be implemented by implementing an analog circuit having the function in this embodiment of the present disclosure or may be implemented by running software having the function in this embodiment of the present disclosure on an intelligent terminal.

In one embodiment of the present disclosure, in an actual application, the rendering processing unit 31, the detection unit 32, and the operation execution unit 33 in the terminal may all be implemented by a central processing unit (CPU), a digital signal processor (DSP) or a field programmable gate array (FPGA) in the terminal.

This embodiment of the present disclosure further provides a terminal. The terminal may be an electronic device such as a PC or may be a portable electronic device such as a tablet computer, a laptop computer, or a smartphone. A game system is executed in the terminal by installing a software application (such as a game application), and the terminal includes at least a memory for storing data and a processor for data processing. For the processor for data processing, during processing, a microprocessor, a CPU, a DSP, or an FPGA may be used for implementation. The memory includes an operation instruction, the operation instruction may be computer executable code, and steps in the procedure of the information processing method in the embodiments of the present disclosure are implemented by using the operation instruction.

Figure 8:
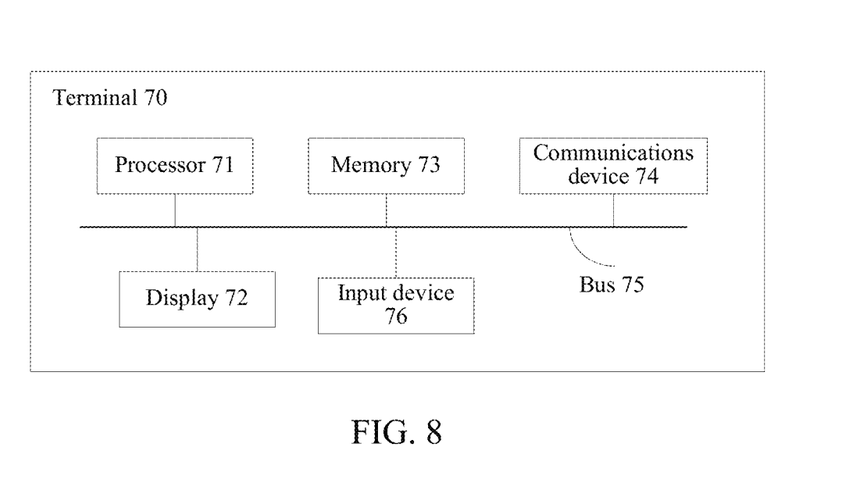
FIG. 8 is a schematic structural diagram of a terminal according to one embodiment of the present disclosure.

FIG. 8 is a schematic structural diagram of a terminal according to one embodiment of the present disclosure. As shown in FIG. 8, the terminal includes: a processor 71 and a display 72. The processor 71 is configured to: execute a software application and perform rendering on the display 72, to obtain a GUI. The processor, the GUI, and the software application are implemented on a game system.

The processor 71 is further configured to perform rendering in the GUI, to obtain at least one virtual resource object, at least one of the virtual resource object being configured as a user character object that performs a virtual operation according to an input user command;

detect, when detecting a skill operation trigger gesture on at least one skill object deployed in a skill operation area in the GUI, movement of the skill object with a skill release trigger gesture, to determine a release location of the skill object;

detect a distance between the release location and the user character object, and adjust, when the distance is greater than a skill release distance, the user character object to move towards the release location; and perform a skill release operation on the skill object based on the release location when detecting a skill operation release gesture on the skill object.

Specifically, the processor 71 is configured to: continuously detect location information of the skill release trigger gesture, control movement of the skill object based on the location information, detect a stop location of the skill release trigger gesture when the skill release trigger gesture stops, and determine the stop location as the release location of the skill object.

In an implementation, the processor 71 is configured to: detect a first location of the user character object in the GUI; determine, based on the release location and the first location, information about a direction of the release location relative to the user character object; and determine a first movement route based on the direction information, and adjust the user character object to move towards the release location according to the first movement route.

In an implementation, the processor 71 is configured to: perform the skill release operation on the skill object within a preset skill release range according to the direction information, where the preset skill release range is an axisymmetric area using the user character object as an endpoint, and the direction information is on an axis of symmetry of the axisymmetric area.

In an implementation, the processor 71 is further configured to: detect, in a process of adjusting the user character object to move towards the release location, a movement trigger gesture on the user character object, stop adjusting the user character object to move towards the release location, and stop performing the skill release operation on the skill object based on the skill operation trigger gesture.

In an implementation, the processor 71 is further configured to stop, when detecting that the release location of the skill object is consistent with a start location of the skill operation trigger gesture, performing the skill release operation on the skill object based on the skill operation trigger gesture.

In this embodiment, the terminal includes: the processor 71, the display 72, a memory 73, an input device 76, a bus 75, and a communications device 74. The processor 71, the memory 73, the input device 76, the display 72, and the communications device 74 are all connected by using the bus 75, and the bus 75 is configured to transmit data between the processor 71, the memory 73, the display 72, and the communications device 74.

The input device 76 is mainly configured to obtain an input operation of a user, and the input device 76 may vary with the terminal. For example, when the terminal is a PC, the input device 76 may be an input device 76 such as a mouse or a keyboard; when the terminal is portable device such as a smartphone or a tablet computer, the input device 76 may be a touchscreen.

In this embodiment, a computer storage medium is stored in the memory 73, a computer executable instruction is stored in the computer storage medium, and the computer executable instruction is configured to perform the information processing method in the embodiments of the present disclosure.

According to the information processing method, the terminal, and the computer storage medium in the embodiments of the present disclosure, when a skill operation trigger gesture on at least one skill object deployed in a skill operation area in a GUI is detected, movement of the skill object with a skill release trigger gesture is detected, to determine a release location of the skill object; a distance between the release location and the user character object is detected, and the user character object is adjusted to move towards the release location when the distance is greater than a skill release distance; and a skill release operation is performed on the skill object based on the release location when a skill operation release gesture on the skill object is detected. In this way, by means of the technical solutions of the embodiments of the present disclosure, skill release is made to be directed to a particular location, thereby greatly improving operation experience of a user.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present disclosure may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a portable storage device, a read-only memory (ROM), a random access memory (RAM), a magnetic disk, or an optical disc.

Alternatively, in the present disclosure, when the integrated unit is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the embodiments of the present disclosure, when a skill operation trigger gesture on at least one skill object deployed in a skill operation area in a GUI is detected, movement of the skill object with a skill release trigger gesture is detected, to determine a release location of the skill object; a distance between the release location and the user character object is detected, and the user character object is adjusted to move towards the release location when the distance is greater than a skill release distance; and a skill release operation is performed on the skill object based on the release location when a skill operation release gesture on the skill object is detected. Skill release is made to be directed to a particular location, thereby greatly improving operation experience of a user.

What is claimed is:

1. An information processing method, applied to a terminal having a processor, a memory and a display, comprising:
   rendering one or more virtual resource objects in a graphical user interface (GUI), at least one of the one or more virtual resource objects being configured as a user character object that performs a virtual operation according to an input user command;
   detecting a skill operation trigger gesture on at least one skill object deployed in a skill operation area in the GUI, the at least one skill object representing at least one skill available to be released by the user character object;
   detecting, in response to the skill operation trigger gesture, a skill release trigger gesture, the skill release trigger gesture being a drag gesture performed on the display that presents the GUI;
   determining movement of the skill object in the GUI according to the skill release trigger gesture to determine a release location of the skill object, the release location of the skill object being a location where the drag gesture stops;
   detecting a first location of the user character object displayed in the GUI;
   determining, based on the release location and the first location, directional information about a direction of the release location relative to the user character object;
   detecting a distance between the release location and the user character object;
   comparing the distance between the release location and the user character object displayed in the GUI with a skill release distance;
   adjusting, in response to determining that the distance between the release location and the user character object is greater than the skill release distance, the user character object to move towards the release location based on the directional information; and
   performing a skill release operation on the skill object within a preset skill release range according to the directional information when detecting a skill operation release gesture on the skill object.

2. The method according to claim 1, wherein the determining movement of the skill object in the GUI according to the skill release trigger gesture to determine a release location of the skill object comprises:
   continuously detecting location information of the skill release trigger gesture performed on the display;
   controlling and updating the movement of the skill object in the GUI presented by the display based on the location information of the skill release trigger gesture;
   detecting a stop location of the skill release trigger gesture when the skill release trigger gesture stops; and
   determining the stop location as the release location of the skill object.

3. The method according to claim 1, wherein the adjusting the user character object to move towards the release location comprises:
   determining a first movement route based on the directional information; and
   adjusting the user character object to move towards the release location according to the first movement route.

4. The method according to claim 3, wherein the preset skill release range is an axisymmetric area using the user character object as an endpoint, and the direction indicated by the directional information matches an axis of symmetry of the axisymmetric area.

5. The method according to claim 4, wherein the preset skill release range is a fan-shaped area.

6. The method according to claim 3, further comprising:
detecting a movement trigger gesture on the user character object in a process of adjusting the character to move towards the release location; and
in response to the movement trigger gesture, stopping adjusting the user character object to move towards the release location, and stopping performing the skill release operation on the skill object based on the skill operation trigger gesture.

7. The method according to claim 1, further comprising:
detecting that the release location of the skill object is consistent with a start location of the skill operation trigger gesture; and
in response to the release location being consistent with the start location, stopping performing the skill release operation on the skill object regardless of a movement path of the drag gesture.

8. A terminal, comprising: a memory; a processor coupled to the memory; and a display; wherein the processor is configured to:
render one or more virtual resource objects in a graphical user interface (GUI), at least one of the one or more virtual resource objects being configured as a user character object that performs a virtual operation according to an input user command;
detect a skill operation trigger gesture on at least one skill object deployed in a skill operation area in the GUI, the at least one skill object representing at least one skill available to be released by the user character object;
detect, in response to the skill operation trigger gesture, a skill release trigger gesture, the skill release trigger gesture being a drag gesture performed on the display that presents the GUI;
determine movement of the skill object in the GUI according to the skill release trigger gesture to determine a release location of the skill object, the release location of the skill object being a location where the drag gesture stops;
detect a first location of the user character object displayed in the GUI;
determine, based on the release location and the first location, directional information about a direction of the release location relative to the user character object;
detect a distance between the release location and the user character object;
comparing the distance between the release location and the user character object displayed in the GUI with a skill release distance;
adjust, in response to determining that the distance between the release location and the user character object is greater than the skill release distance, the user character object to move towards the release location based on the directional information; and
perform a skill release operation on the skill object within a preset skill release range according to the directional information when detecting a skill operation release gesture on the skill object.

9. The terminal according to claim 8, wherein the processor is configured to:
continuously detect location information of the skill release trigger gesture performed on the display,
control and update the movement of the skill object in the GUI presented by the display based on the location information of the skill release trigger gesture,
detect a stop location of the skill release trigger gesture when the skill release trigger gesture stops, and
determine the stop location as the release location of the skill object.

10. The terminal according to claim 8, wherein the processor is configured to:
determine a first movement route based on the directional information; and
adjust the user character object to move towards the release location according to the first movement route.

11. The terminal according to claim 10, wherein the preset skill release range is an axisymmetric area using the user character object as an endpoint, and the direction indicated by the directional information matches an axis of symmetry of the axisymmetric area.

12. The terminal according to claim 10, wherein the processor is further configured to:
detect, in a process of adjusting the user character object to move towards the release location, a movement trigger gesture on the user character object, and
in response to the movement trigger gesture, stop adjusting the user character object to move towards the release location, and stop performing the skill release operation on the skill object based on the skill operation trigger gesture.

13. The terminal according to claim 8, wherein the processor is further configured to:
detect that the release location of the skill object is consistent with a start location of the skill operation trigger gesture; and
stop, in response to the release location being consistent with the start location, performing the skill release operation on the skill object regardless of a movement path of the drag gesture.

14. A non-transitory computer storage medium, a computer executable instruction being stored in the computer storage medium, and the computer executable instruction, when being executed by a processor, causing the processor to perform:
rendering one or more virtual resource objects in a graphical user interface (GUI), at least one of the one or more virtual resource objects being configured as a user character object that performs a virtual operation according to an input user command;
detecting a skill operation trigger gesture on at least one skill object deployed in a skill operation area in the GUI, the at least one skill object representing at least one skill available to be released by the user character object;
detecting, in response to the skill operation trigger gesture, a skill release trigger gesture, the skill release trigger gesture being a drag gesture performed on a display coupled to the processor and configured to present the GUI;
determining movement of the skill object in the GUI according to the skill release trigger gesture to determine a release location of the skill object, the release location of the skill object being a location where the drag gesture stops;
detecting a first location of the user character object in the GUI;
determining, based on the release location and the first location, directional information about a direction of the release location relative to the user character object;

detecting a distance between the release location and the user character object;

comparing the distance between the release location and the user character object displayed in the GUI with a skill release distance;

adjusting, in response to determining that the distance between the release location and the user character object is greater than the skill release distance, the user character object to move towards the release location based on the directional information; and performing a skill release operation on the skill object within a preset skill release range according to the directional information based on the release location when detecting a skill operation release gesture on the skill object.

15. The storage medium according to claim 14, wherein the determining movement of the skill object in the GUI according to the skill release trigger gesture to determine a release location of the skill object comprises:

continuously detecting location information of the skill release trigger gesture performed on the display;

controlling and updating the movement of the skill object in the GUI presented by the display based on the location information of the skill release trigger gesture;

detecting a stop location of the skill release trigger gesture when the skill release trigger gesture stops; and determining the stop location as the release location of the skill object.

16. The storage medium according to claim 14, wherein the adjusting the user character object to move towards the release location comprises:

determining a first movement route based on the directional information; and adjusting the user character object to move towards the release location according to the first movement route.

17. The storage medium according to claim 16, wherein the preset skill release range is an axisymmetric area using the user character object as an endpoint, and the direction indicated by the directional information matches an axis of symmetry of the axisymmetric area.

18. The storage medium according to claim 16, wherein the computer executable instruction further causes the processor to perform:

detecting a movement trigger gesture on the user character object during a process of adjusting the character to move towards the release location; and in response to the movement trigger gesture, stopping adjusting the user character object to move towards the release location, and stopping performing the skill release operation on the skill object based on the skill operation trigger gesture.

19. The storage medium according to claim 14, wherein the computer executable instruction further causes the processor to perform:

detecting that the release location of the skill object is consistent with a start location of the skill operation trigger gesture; and in response to the release location being consistent with the start location, stopping performing the skill release operation on the skill object regardless of a movement path of the drag gesture.

* * * * *